(12) United States Patent
Seals et al.

(10) Patent No.: US 8,377,840 B2
(45) Date of Patent: Feb. 19, 2013

(54) METHOD OF PRODUCING CATALYTIC MATERIALS FOR FABRICATING NANOSTRUCTURES

(75) Inventors: Roland D. Seals, Oak Rdige, TN (US);
Paul A. Menchhofer, Clinton, TN (US);
Jane Y. Howe, Oak Ridge, TN (US);
Wei Wang, Oak Ridge, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 731 days.

(21) Appl. No.: 12/370,892

(22) Filed: Feb. 13, 2009

(65) Prior Publication Data

US 2010/0210457 A1      Aug. 19, 2010

(51) Int. Cl.
*B01J 21/08*      (2006.01)
*B01J 21/06*      (2006.01)

(52) U.S. Cl. ........ 502/259; 502/258; 502/260; 502/150; 502/232; 502/325; 423/132; 423/150.1

(58) Field of Classification Search .................. 423/132, 423/150.1; 502/150, 325, 232, 258, 259, 502/260; *B01J 21/06, 21/08*
See application file for complete search history.

(56) References Cited

U.S. PATENT DOCUMENTS

| | | | |
|---|---|---|---|
| 3,489,694 A * | 1/1970 | Weidlich et al. ............... | 252/477 |
| 6,420,293 B1 | 7/2002 | Chang et al. | |
| 6,652,967 B2 | 11/2003 | Yadav et al. | |
| 6,660,959 B2 | 12/2003 | Vallance et al. | |
| 6,676,919 B1 | 1/2004 | Fischer et al. | |
| 6,746,508 B1 | 6/2004 | Deevi et al. | |
| 6,746,597 B2 | 6/2004 | Zhou et al. | |
| 7,166,663 B2 | 1/2007 | Cayton et al. | |
| 2004/0199019 A1 | 10/2004 | Schmidt | |
| 2006/0228282 A1* | 10/2006 | Zhou et al. .................. | 423/239.1 |
| 2007/0026294 A1 | 2/2007 | Shimazaki et al. | |
| 2007/0035226 A1 | 2/2007 | Ganapathiraman et al. | |
| 2007/0191221 A1 | 8/2007 | Hussain et al. | |
| 2008/0045401 A1 | 2/2008 | Zhou et al. | |
| 2009/0226704 A1 | 9/2009 | Kauppinin et al. | |

OTHER PUBLICATIONS

Rick Demeis, Take a Nano Powder, Designs News, Mar. 1, 1999, Fairfax, VA, http://www.designnews.com/index.asp?layout=article Print&articleID=CA86761 (2 pp.).

* cited by examiner

*Primary Examiner* — Jun Li
(74) *Attorney, Agent, or Firm* — Michael J. Renner, Esq.; Luedeka Neely Group, P.C.

(57) ABSTRACT

Methods of fabricating nano-catalysts are described. In some embodiments the nano-catalyst is formed from a powder-based substrate material and is some embodiments the nano-catalyst is formed from a solid-based substrate material. In some embodiments the substrate material may include metal, ceramic, or silicon or another metalloid. The nano-catalysts typically have metal nanoparticles disposed adjacent the surface of the substrate material. The methods typically include functionalizing the surface of the substrate material with a chelating agent, such as a chemical having dissociated carboxyl functional groups (—COO), that provides an enhanced affinity for metal ions. The functionalized substrate surface may then be exposed to a chemical solution that contains metal ions. The metal ions are then bound to the substrate material and may then be reduced, such as by a stream of gas that includes hydrogen, to form metal nanoparticles adjacent the surface of the substrate.

5 Claims, 4 Drawing Sheets

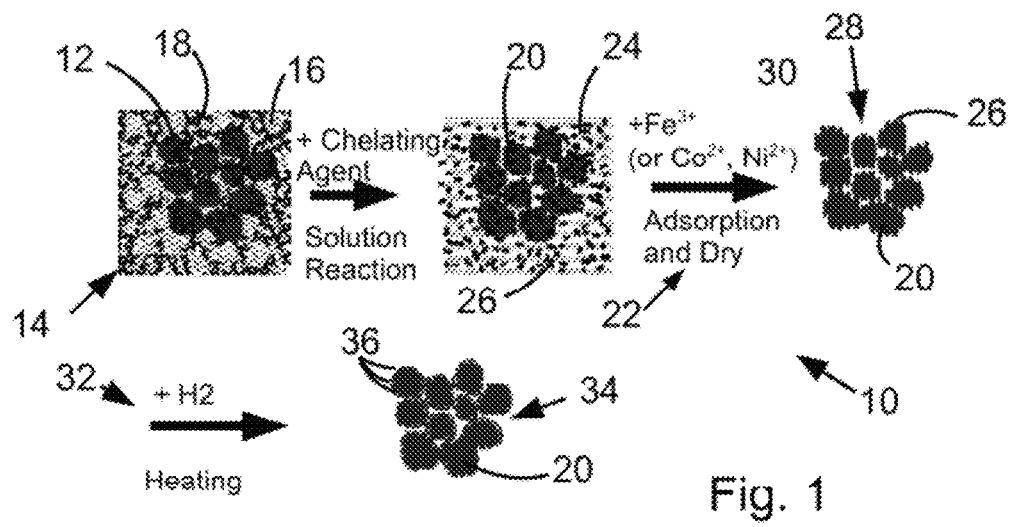
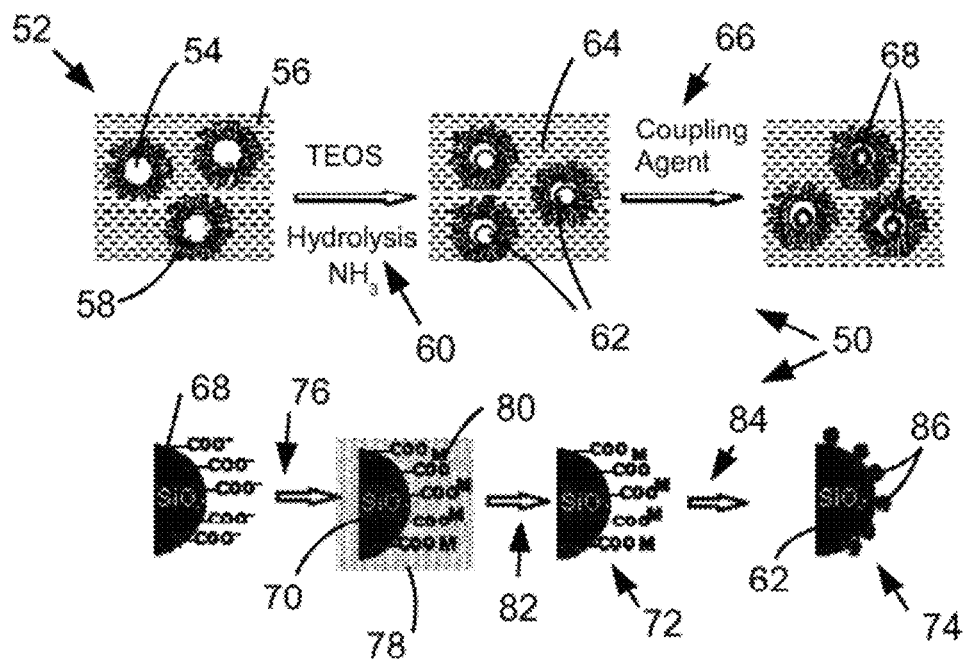
Fig. 2

METHOD OF PRODUCING CATALYTIC MATERIALS FOR FABRICATING NANOSTRUCTURES

GOVERNMENT RIGHTS

The U.S. Government has rights to this invention pursuant to contract number DE-AC05-00OR22800 between the U.S. Department of Energy and Babcock & Wilcox Technical Services Y-12, LLC.

This invention was made with government support under Contract No. DE-AC05-00OR22725 awarded by the U.S. Department of Energy. The government has certain rights in the invention.

FIELD

This disclosure relates to the field of catalytic materials. More particularly, this disclosure relates to catalytic materials for the fabrication of nanostructures.

BACKGROUND

Nanostructures are objects that have physical dimensions between those of sub-atomic-scale (less than one Angstrom-sized) structures and microscopic-scale (greater than one tenth micrometer-sized) structures. Nanostructures are said to have nano-scale features. "Nano-scale" refers to a dimension that is between approximately one Angstrom (0.1 nanometer) and approximately 100 nanometers (0.1 micrometer). Nano-scale features may occur in one, two, or three dimensions. For example, nano-textured surfaces have one nano-scale dimension. That is, such surfaces have nano-features such as ridges, valleys or plateaus that provide surface height variations that range from about 0.1 to about 100 nanometers. Another example of a one-dimension nanostructure is a film that has a thickness that ranges from about 0.1 to about 100 nanometers. Nanotubes are examples of nanostructures that have two nano-scale dimensions. That is, a nanotube has a diametral dimension and a length. The diametral dimension of a nanotube ranges from about 0.1 to about 100 nanometers. The length of a nanotube may be greater than hundreds of microns. Nanoparticles have three diametral nano-scale dimensions. Each diametral dimension of a nanoparticle ranges from about 0.1 to about 100 nm.

Nanostructures may be formed from carbon, silicon, boron, various metal and metalloid elements, various compounds, alloys and oxides of those elements, ceramics, various organic materials including monomers and polymers, and potentially any other material. Nanostructures have potential use in various physical, chemical, mechanical, electronic and biological applications. Nanomaterials are collections of nanostructures. The formation, collection, and assembly of nanomaterials generally involve difficult and expensive processes. One major issue with nanomaterials is the difficulty of production of the nanostructures in sufficient quantity, purity, and uniformity of morphology to be useful. What are needed therefore are better systems and methods for manufacturing nanomaterials.

SUMMARY

In one embodiment the present disclosure provides a method of fabricating a nano-catalyst that includes a step of contacting a metal powder with a first solution comprising a complexing agent to produce a complexed metal powder and a residual first solution. A further step includes separating the complexed metal powder and a substantial portion of the residual first solution from each other. The method proceeds with a step of contacting the complexed metal powder with a second solution comprising metal ions to produce (i) a loaded metal powder wherein at least a portion of the metal ions are bound to the complexed metal powder and (ii) a residual second solution. The method typically includes separating the loaded metal powder and substantially all of the residual second solution from each other to produce a dry loaded metal powder, and then contacting the metal ions bound to the complexed metal powder with a reducing atmosphere to form the nano-catalyst as metal nanoparticles on the metal powder.

In some embodiments employing a metal powder, the complexing agent includes a chelating agent and in some embodiments the complexing agent includes a coupling agent. In various embodiments the metal powder may include NiAl. In some embodiments where the metal powder includes NiAl the metal ions may include $Fe^{3+}$. In some embodiments, regardless of the substrate, the metal ions may include $Fe^{3+}$, $Ni^{2+}$, $Co^{2+}$, or $Co^{3+}$.

Further provided herein is a method of fabricating a nano-catalyst that begins with providing a microemulsion medium comprising a surfactant, water, and an organic compound selected from the group consisting of hexanol, cyclohexane, and a combination thereof. The method includes a further step of contacting an organic silane with the microemulsion to form silicon dioxide nanoparticles, and a step of contacting the silicon dioxide particles with a complexing agent to form complexed silicon dioxide nanoparticles. The method typically proceeds with contacting the complexed silicon dioxide nanoparticles with a solution comprising metal ions to produce (i) loaded silicon dioxide nanoparticles wherein at least a portion of the metal ions are bound to the complexed silicon dioxide nanoparticles and (ii) a residual solution. The method then provides the steps of separating the loaded silicon dioxide nanoparticles and substantially all of the residual solution from each other to produce dry loaded silicon dioxide nanoparticle, and contacting the metal ions bound to the complexed silicon dioxide nanoparticles with a reducing atmosphere to form the nano-catalyst as metal nanoparticles on the silicon dioxide nanoparticles.

In some embodiments employing the aforementioned microemulsion medium the complexing agent includes a chelating agent and in some embodiments the complexing agent includes a coupling agent. In various embodiments the metal powder may include NiAl. In some embodiments where the metal powder includes NiAl the metal ions may include $Fe^{3+}$. In some embodiments, regardless of the substrate, the metal ions may include $Fe^{3+}$, $Ni^{2+}$, $Co^{2+}$, or $Co^{3+}$.

Further provided is a method of fabricating a nano-catalyst that typically begins with a step of washing substrate material that includes silicon with one or more materials selected from the group consisting of ethanol, acetone, chloroform, and water to form a treated substrate material. Further steps provide for contacting the treated substrate material with nitric acid to provide an activated substrate material and then contacting the treated substrate material with a complexing agent to provide a complexed substrate material. A further step includes contacting the complexed substrate material with metal ions wherein at least a portion of the metal ions are bound to the complexed substrate material and then a final step provides for contacting the metal ions bound to the complexed substrate material with a reducing atmosphere to form the nano-catalyst as metal nanoparticles on the substrate material.

In some embodiments employing silicon substrate material the substrate material includes a silicon wafer.

In some embodiments employing silicon substrate material the complexing agent includes a chelating agent and in some such embodiments the complexing agent includes a coupling agent. Sometimes the complexing agent comprises a mixture of chloroform and a silane compound.

Further provided is a method of fabricating a metal-powder-based nano-catalyst that includes contacting a metal powder with a solution that includes metal ions from a metal salt having an anion and that includes an acid comprising the anion of the metal salt to form loaded metal powder comprising metal ions, separating the loaded metal powder and substantially all of the solution that includes metal ions from each other; and reducing the metal ions to form the metal-powder-based nano-catalyst. In some of these embodiments the solution that includes the metal ions includes a metal salt selected from the group consisting of an iron salt, a nickel salt, a cobalt salt, and combinations of two or more of the foregoing. Sometimes the solution that includes the metal ions includes two or more metal salts selected from the group consisting of an iron salt, a nickel salt, and a cobalt salt and combinations of two or more of the foregoing. Some embodiments of this method further include a step of activating the surface of a metal powder and then these embodiments proceed with contacting the metal powder with a solution comprising metal ions to form loaded metal powder comprising metal ions.

Further provided is a method of fabricating a nano-catalyst that begins with etching a substrate comprising a metal selected from the group consisting of scandium, titanium, vanadium, chromium, manganese, iron, cobalt, nickel, copper, and zinc with an etchant selected from the group consisting of an aqueous solution of an aluminum salt, a dilute acid, and a combination thereof, wherein metal ions from the substrate form in the etchant. This method proceeds with drying the substrate in the presence of the etchant, wherein nano-size deposits comprising the metal ions are deposited adjacent the surface of the substrate. The method concludes with reducing the metal ions to produce the nano-catalyst. In some of these embodiments the substrate includes nickel and the etchant is selected from the group consisting of an aqueous solution of a chloride salt of aluminum, dilute hydrochloric acid, and combinations thereof. In some of these embodiments the substrate comprises nickel and the etchant is selected from the group consisting of an aqueous solution of a nitrate salt of aluminum salt, dilute nitric acid, and combinations thereof.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 1 is a somewhat schematic illustration of a method of fabricating nano-catalysts.

FIG. 2 is a somewhat schematic illustration of a method of fabricating nano-catalysts.

DETAILED DESCRIPTION

Figure 3:
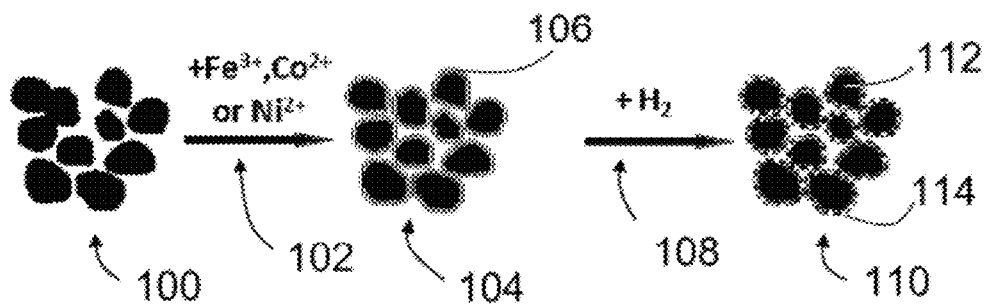
FIG. 3 is a somewhat schematic illustration of a method of fabrication nano-catalysts.

In the following detailed description of the preferred embodiments, reference is made to the accompanying drawings, which form a part hereof, and within which are shown by way of illustration the practice of specific embodiments of methods of fabricating nano-catalysts. It is to be understood that other embodiments may be utilized, and that structural changes may be made and processes may vary in other embodiments.

Disclosed herein are various processes for fabricating nano-catalysts that have utility for forming nanostructures and manufacturing nanomaterials. In some embodiments the nano-catalysts include nanoparticles that are disposed adjacent the surface of powder particles. The nanoparticles are typically metal. The powder particles are typically metal or ceramic particles. Nano-catalysts that have nanoparticles disposed adjacent the surface of powder particles are an example of powder-based nano-catalysts.

Powder-based nano-catalysts may be used in various processes to produce nanostructures and nanomaterials. For example, powder-based nano-catalysts may be used to grow carbon nanotubes that may be harvested and used as nanomaterials. The powder-based nano-catalysts may also be incorporated as a constituent of components and coatings that then have catalytic properties for enhancing the formation of nanostructures within the component or the coating. That is, instead of first fabricating and collecting nanostructures as nanomaterials and then mixing those nanomaterials with other constituents to form nanostructure-bearing composite materials, powder-based nano-catalysts may be mixed with other constituents and nanostructures may then be grown in-situ to form nanostructure-bearing composite materials. The term "in-situ" refers a formation of nanostructures (e.g., carbon nanotubes) on individual powder particles that may subsequently be used to fabricate composite materials that incorporate the anchored nanostructure material, without transferring the nanostructures to another material or powder for such use. The nanostructure-bearing composite material may be formed as a layer that is disposed adjacent the surface of a component or the nanostructure-bearing composite material may be formed as a portion or all of the bulk material of the component.

Chemical processes may be used to form nanoparticles adjacent the surface of powder materials of interest. That is, the powder materials of interest may be chemically treated in a solution to deposit nano-size catalyst particles adjacent the surface of the powders by precipitation or reactive precipitation processes. Such techniques may be applied to virtually any ceramic or metal powders or powders formed from combinations of metals and ceramics. For example, all Sc containing metals, alloys, and intermetallics; all Ni containing metals, alloys, and intermetallics; all Fe containing metals, alloys, and intermetallics; all Cr containing metals, alloys, and intermetallics; all Co containing metals, alloys, and intermetallics; all Ti containing metals, alloys, and intermetallics; all V containing metals, alloys, and intermetallics; all Mn containing metals, alloys, and intermetallics; all Cu containing metals, alloys, and intermetallics; and all Zn containing metals, alloys, and intermetallics may be used. Y, Zr, Nb, Ru, Rh, Pd, Hf, Ta, W, Re, Ir, Pt, and Au containing metals, alloys, and intermetallics may also be used, as well as, Ce, Th, and U containing metals, alloys, and intermetallics.

The following provides detailed descriptions of various embodiments, including nanoparticle generation and the production of nano-catalysts by deposition of the nanoparticles on the surface of selected metal, metal alloy, or ceramic powders or powders that included mixtures of those materials. The powder-based nano-catalysts having nanoparticles adjacent the surfaces of the powder particles' surfaces are referred to as metal-powder-based nano-catalysts or as ceramic-powder-based nano-catalysts depending on whether the powder is a metal or a ceramic. Powder-based nano-catalysts may also be formed from silicon or other metalloid powders; such nano-catalysts are categorized as metal-based-powder nano-catalysts.

The surfaces of a substrate material having the shape of a geometric solid may also be used to support nano-size catalyst particles. Such structures are referred to herein as "solid-based nano-catalysts." Solid-based nano-catalysts may utilize a silicon wafer or other ceramic material as a substrate. Powder-based nano-catalysts and solid-based nano-catalysts are collectively referred to herein as "nano-catalysts."

To facilitate the formation of nano-catalysts on the surfaces of powders or solid substrates, a "complexing agent" may be added to the surface of a powder or a substrate. As used herein the term "complexing agent" refers to a coupling agent, a chelating agent, or a similar chemical structure that facilitates the binding of metal ions to the powder or substrate by such mechanisms as a chemical ionic bond or a chemical covalent bond or a chemical coordinate covalent bond or a chemical attraction resulting from electro-negative/positive effects. With a coupling agent, an atom (e.g., a metal ion) of the nano-catalyst is bound to a single atom (e.g., an oxygen ion) of the complexing agent, whereas with a chelating agent, an atom (e.g., a metal ion) of the nano-catalyst is bound to two or more atoms (e.g., two oxygen ions, or an oxygen ion and a nitrogen ion, or multiples of such ions) of the complexing agent. A carboxyl functional group (—COO$^-$) is an example of a coupling agent, while ethylene diamine tetraacetic acid (EDTA) is an example of a chelating agent.

FIG. 1 illustrates an embodiment of a process 10 for forming metal-powder-based nano-catalysts. In a typical formulation, 100 g of metal powder 12 is mixed in a first solution 14. Before mixing with the first solution 14 the metal powder 12 may be washed with deionized water (1 liter of water is typically sufficient) to clean off residual dust and debris, although typically this is not necessary. The metal powder 12 may also be washed with an acid, such as hydrochloric acid, to activate its surface. The metal powder 12 may, for example, be NiAl powder having particle sizes that range from about 10 nanometers to about 100 microns in diameter. NiAl powders and other powders ranging from about 0.5 microns to about 60 microns in diameter are typical. Such powders are referred to herein as powder particles. The first solution 14 typically includes (a) a mixture 16 of (1) ethanol (ranging from about 0 wt. % to about 50 wt. %) and (2) water (ranging from about 50 wt. % to about 100 wt. %) and (b) a chelating agent 18 (ranging from about 0.05 wt. % to about 0.5 wt. %). The chelating agent 18 may be ethylene diamine tetraacetic acid (EDTA) or a similar chemical. Generally the metal powder 12 is mixed with the first solution 14 for approximately 30 minutes using an ultrasonic bath. The first solution 14 and the metal powder 12 are then allowed to stand, typically for at least approximately an hour up to about 6 hours (but overnight or up to 12 hours is not deleterious). This mixing and soaking produces a chelated metal powder 20.

The process 10 includes a step 22 that involves (a) separating the chelated metal powder 20 from the residual first solution 14, typically by pouring the mixture of the first solution 14 and the chelated metal powder 20 through a filter and (b) washing the chelated metal powder 20 with deionized water to remove excess chelating agent 18 that may have accumulated with the chelated metal powder 20. The chelated metal powder 20 is then added to a second solution 24 that includes metal ions 26. The second solution 24 may be 250 ml of a 0.001M to 1M (preferably 0.1M) solution of $FeCl_3$, which of course contains $Fe^{3+}$ ions. In other embodiments solutions containing other metal ions such as $Co^{2+}$, $Co^{3+}$, or $Ni^{2+}$ may be used. The chelated metal powder 20 and the second solution 24 are stirred for about thirty minutes to about six hours or longer and then filtered to remove "loaded" metal powder 28 from the supernatant (residual) second solution 24. As used herein the term "loaded" refers to a configuration where ions are bound to (as in a chemical ionic bond or a chemical covalent bond or a chemical attraction resulting from electro-negative/positive effects) a surface of an element either directly or through an intermediate material. In this case the metal ions 26 are bound to the chelated metal powder 20 by the chelating agent 18. The loaded metal powder 28 may then be washed with deionized water to remove excess $Fe^{3+}$ ions. The wash water containing $Fe^{3+}$ ions may be analyzed by UV-visible spectroscopy to determine the concentration of $Fe^{3+}$ in the wash water. The loaded metal powder 28 may then be dried under a vacuum (step 30), or it may be air dried.

In some instances it may be desirable to determine the quantity of $Fe^{3+}$ ions that are loaded on the loaded metal powder 28. This may be determined by using UV-visible spectroscopy to determine the concentration of $Fe^{3+}$ ions that were retained in the residual second solution 24 after the loaded metal powder 28 was filtered from the residual second solution 24 and the concentration of $Fe^{3+}$ ions that were washed from the loaded metal powder 28, and then using the volume of each solution to calculate the moles of $Fe^{3+}$ that were removed by those processes, and then subtracting that removed quantity from the total starting quantity of moles of $Fe^{3+}$ in the first solution 14 to determine the number of moles of $Fe^{3+}$ ions loaded on the loaded metal powder 28. Typically the concentration of $Fe^{3+}$ ions (i.e., the metal ions 26) loaded on to the surface of loaded metal powder 28 (where the loaded metal powder 28 is NiAl) is about $3 \times 10^{-7}$ grams of $Fe^{3+}$ per gram of loaded metal powder 28 when the solution is approximately 0.001M $FeCl_3$. The loaded amount may be increased by using higher concentrations of $FeCl_3$ solutions.

The final step 32 for producing a metal-powder-based nano-catalyst 34 is contacting the dried loaded metal powder 28 with a reducing environment. In a preferred method of reducing the metal ions, the loaded metal powder 28 may be placed under a hydrogen atmosphere containing about 4 wt. % hydrogen and about 96 wt. % argon at a temperature above about 400° C. (generally 500-850° C.) for at least approximately 5 minutes, to reduce the metal ions 26 and form the metal-powder-based nano-catalyst 34 as metal nanoparticles 36 on the metal powder 12. Extending the time of exposure to the reducing environment to about 30 minutes increases the percentage of the metal ions 26 that are reduced, and an exposure time of approximately one hour may increase the percentage. Exposure times beyond about two hours have diminishing returns with approximately twenty four hours of exposure being the limit for any statistically significant increase.

In some embodiments a ceramic-powder-based nano-catalyst may be formed using silica (silicon dioxide) powder by producing mono-dispersed silica nanoparticles that are synthesized using wet colloidal chemical methods. A chelating process or a coupling agent process may be used to attach functional groups to the silica particle surfaces followed by loading metal ions onto the functionalized silica particles. Nano-catalysts may also be produced from ceramic powders by washing them with salt solutions as described herein for producing nanocatalysts from metal powders. The ceramic-powder-based nano-catalysts may then be produced by chemical reduction of the metal ions in solution or by hydrogen reduction in the solid phase at high temperature.

FIG. 2 illustrates an embodiment of a method for fabricating a ceramic-powder-based nano-catalyst. The process 50 begins with forming a microemulsion medium 52 that typically comprises water droplets 54, oil 56, and a surfactant 58. The oil 56 is typically hexanol or cyclohexane or a mixture ranging from about 0 wt. % to about 20 wt. % hexanol and from about 80 wt. % to about 100 wt. % cyclohexane. The water droplets 54 typically comprise from about 5 wt. % to about 15 wt. % of the total microemulsion medium 52, the oil 56 typically comprises from about 50 wt. % to about 90 wt. % of the total microemulsion medium 52, and the surfactant 58 typically comprises from about 5 wt. % to about 15 wt. % of the total microemulsion medium 52. A polyethylene glycol p-tert-octylphenyl ether, such as commercially available TRITON-101® may be used as the surfactant. Another suitable surfactant is tert-octylphenoxy poly(ethyhleneoxy)ethanol sold commercially under the trade name IGEPAL (® Canada only). In the process depicted in FIG. 2, water-in-oil microemulsions such as this serve as nanoreactors to produce components of the ceramic-powder-based nano-catalysts.

The process 50 continues with mixing an organic silane with the microemulsion in the presence of ammonia to form silicon dioxide nanoparticles. Typically from about 20 gr. to about 100 gr. of tetraethoxysilane (TEOS)-$Si(OC_2H_5)_4$ and from about 2 gr. to about 5 gr. of ammonia ($NH_3$) are mixed to form approximately 200 to about 1000 gr. of microemulsion medium 52 to initiate a TEOS hydrolysis process 60. That is, silicon dioxide nanospheres are grown in the water droplets 54 by hydrolysis of tetraethoxysilane (TEOS) in the presence of $NH_3$ catalysts. The reaction produces amorphous silicon dioxide nanoparticles 62 that are approximately spherical and that typically range from about 50 to about 500 nm in diameter, however diameters ranging from about 10 nm to about 10 μm are possible.

The reactions are a follows:

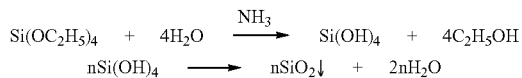

The silicon dioxide nanoparticles 62 in a reaction solution 64 are then surface modified by hydrolysis of the organosilane (a silicon alkoxide) to form functional groups —$COO^-$. A coupling agent such as a sodium salt of N-(trimethoxysilylpropyl)ethylenediamne triacetate may be added to the reaction solution 64 in an amount ranging from about 0.2 wt. % to about 1 wt % based on the total weight of the reaction solution 64 to initiate a process 66 that modifies the surface of the silicon dioxide nanoparticles 62 to form functionalized silicon dioxide nanoparticles 68. Typically the process involves modifying the silicon dioxide nanoparticles 62 to add functional groups, such as carboxyl functional groups (—$COO^-$) (a coupling agent) that have enhanced affinity for metal ions. After their formation the functionalized silicon dioxide nanoparticles 68 may then be removed from the reaction solution 64 by, for example, a process of destabilization (e.g., centrifugation) and the collected particles may be washed in an alcohol and water mixture. For simplicity of illustration the various forms of silicon dioxide nanoparticles (68, 70, 72, and 74) shown in the lower portion of FIG. 2 are portrayed as hemispheres, although in reality they are substantially spherical in form as shown in the upper portion of FIG. 2.

Metal ions, such as $Fe^{3+}$, $Co^{2+}$, and $Ni^{2+}$, may be loaded onto the surface of the functionalized silicon dioxide nanoparticles wherein the metal ions are substantially homogeneously attracted to, attached to, or adsorbed to the surface functional groups. For example, in a step 76 the functionalized silicon dioxide nanoparticles 68 may be mixed in a solution 78 comprising metal ions 80 to produce loaded silicon dioxide nanoparticles 70 wherein the metal ions are bound to (as in a chemical ionic bond or a chemical covalent bond or a chemical attraction resulting from electro-negative/positive effects) the functionalized silicon dioxide nanoparticles.

In this embodiment the method of fabricating a ceramic-powder-based nano-catalyst then proceeds with a step 82 for separating the loaded silicon dioxide nanoparticles 70 from substantially all of the residual solution 78 to produce dry loaded silicon dioxide nanoparticles 72. For example, the loaded silicon dioxide nanoparticles 70 may be separated from substantially all of the residual solution 78 by centrifuging the mixture and drying the loaded silicon dioxide nanoparticles 70 in a vacuum, or air drying under a hood.

The final step 84 for producing the ceramic-powder-based nano-catalyst is to expose the dried loaded silicon dioxide nanoparticles 72 to a reducing environment such as by placing the dried loaded silicon dioxide nanoparticles 72 under a hydrogen atmosphere (such as an atmosphere containing about 4 wt. % hydrogen and about 96 wt. % argon) at a temperature ranging from about 400° C. to about 1200° C. (typically from about 500° C. to about 850° C.) for approximately 5 minutes, to reduce the metal ions to metal and form the ceramic-powder-based nano-catalyst 74 as metal nanoparticles 86 on the silicon dioxide nanoparticles 62. Extending the exposure time to a range from about 30 minutes to about 2 hours may be beneficial.

FIG. 3 presents a further alternate embodiment for forming metal-powder-based nano-catalysts. The process starts with a metal powder 100. In some embodiments the metal powder 100 may be pre-treated with an acid (such as hydrochloric acid) to activate its surface. Then as depicted in FIG. 3 the metal powder 100 may be washed with a metal-ion-containing solution 102 (e.g., a metal chloride salt solution) that typically comprises ions of iron (e.g., $Fe^{3+}$), cobalt (e.g., $Co^{2+}$) or nickel (e.g., $Ni^{2+}$), or combinations of two or more such ions. Metal nitrate salts (e.g., ferric nitrate) may also be used. Some beneficial synergism has been observed in solutions containing two or more such ions, particularly where the metal powder 100 is NiAl. Typically, the metal-ion-containing solution 102 is formed from a metal salt and an acid that includes the anion of the metal salt. That is, when the metal salt is a chloride salt, the acid is hydrochloric acid; when the metal salt is a nitrate, the acid is nitric acid; when the metal salt is a sulfate, the acid is sulfuric acid, and so forth. In some embodiments $AlCl_3$ may be added to provide an excess of $Cl^-$ ions, which are useful for breaking up any $Al_2O_3$ that may be present. $Al^{3+}$ ions are preferably included in the wash solutions to create catalysts, and $AlCl_3$ may be used to break up oxide coatings on aluminum, and/or to act as a Lewis acid, or/and to generate HCl acid. $AlCl_3$ hydrolyzes in water to form HCl acid which is an etchant for many metals helping to form catalytic features. It is a favorable species in aqueous metal salt solutions. $AlCl_3$ in water (aqueous solutions) also provides $[Cl]^-$ ions or/and $[AlCl_4]^-$ ions which are reactive in the depositions of the metal catalytic spots or dots on the larger, micron-sized powder and substrate surfaces.

Also, whereas a fresh aqueous solution of $FeCl_3$ is naturally acidic, over time, the pH may increase as colloidal iron hydroxide (ferrous hydroxide) is formed. These colloids may precipitate and cause problems. To reduce the formation of such colloids it is advantageous to adjust the pH of a $FeCl_3$ solution to a pH less than approximately three. The addition of dilute hydrochloric acid is the preferred method of reducing the pH. Using 0.1 M HCl or another weak acid solution (instead of water) as the washing medium stabilizes the $Fe^{3+}$ ions and prevents their conversion to $Fe^{2+}$. When nitrate salts are used, dilute nitric acid is preferable as the washing medium.

The foregoing washing process produces a loaded metal powder 104. That is, the loaded metal powder 104 is a metal powder having metal ions 106 attached thereto. The loaded metal powder 104 is then separated from the supernatant metal chloride ion solution and dried either by air drying or a vacuum. The metal ions 106 on the loaded metal powder 104 may be reduced while at a temperature of about 600° C., typically using a hydrogen gas atmosphere 108 that is typically 4% $H_2$ and 96% Ar, typically heated to about 600° C. The reduction process typically takes about 5 minutes but longer process times ranging from about 30 minutes to about 2 hours may be beneficial. The result is metal-powder-based catalyst 110 that comprises a metal powder 112 with surface metal nanoparticle catalysts 114.

As an example of the embodiment of FIG. 3 a metal powder, such as 10 gr. of NiAl powder, may be mixed with a metal salt solution, such as 10 mL of 0.001M-1M (typically 0.1M) $FeCl_3$, and optionally a chelating agent such as EDTA. Typically the mixing includes several (typically two) hours of ultrasonic agitation or ball milling for 1 to 10 minutes. This process attaches metal ions (in this case, iron ions) to the metal (in this case NiAl) powder to create a metal-powder-based nano-catalyst. The solution may then be allowed to stand for several minutes up to several days (typically a few hours) to allow the metal-powder-based nano-catalysts to settle. The metal-powder-based nano-catalysts may then be separated from the solution (such as by filtering and drying in a vacuum) to form loaded metal powder. The loaded metal powder may be dried in a drying oven, typically at approximately 70° C.-80° C., or dried in air or in a vacuum. The metal ions that are attached to the metal powder may be contacted with an argon gas containing about 4 wt. % hydrogen to reduce the metal ions to metal nanoparticles, wherein the metal-powder-based nano-catalysts are formed.

A further method of fabricating a metal-powder-based nano-catalyst includes a step of washing a metal powder (such as NiAl) with a solution comprising (i) metal ions from a metal salt having an anion and (ii) an acid comprising the anion of the metal salt, to form loaded metal powder that has metal ions. For example, the metal salt may be $FeCl_3$ and the acid may be (preferably dilute, such as 0.1 M) HCl that are mixed to form a 0.01-1 M (preferably 0.1M) solution of $FeCl_3$ to form a loaded metal powder having metal ions (e.g., Fe ions) disposed adjacent the surface of the powder. Then the loaded metal powder and substantially all of the solution comprising metal ions are separated from each other by filtering and drying. Finally the metal ions are reduced (such as in by hydrogen) to form the metal-powder-based nano-catalyst. In some embodiments the solution having the metal ions includes a metal salt selected from the group consisting of an iron salt, a nickel salt, a cobalt salt, and combinations of two or more of those metal salts. In some embodiments the solution having the metal ions includes two or more metal salts selected from the group consisting of an iron salt, a nickel salt, and a cobalt salt and combinations of two or more of the foregoing. Some embodiments of this method begin with the optional step of activating the metal powder. Processes similar to those described for forming powder-based nano-catalysts may be used for fabrication of a solid-based nano-catalyst. Solid-based nano-catalysts have metal nano-particles disposed adjacent the surface of a substrate material having the shape of a geometric solid. The substrate may, for example, be a fully-dense or a porous wafer, plate, rod, honeycomb, a foam such as a carbon or metal foam or other geometric three-dimensional body, or a similar structure. Small granular materials may be used as substrates for solid-based nano-catalysts. The distinction between (a) "powder-based" nano-catalysts and (b) "solid-based" nano-catalysts that use granular substrates is based on the diameter of the substrate. Generally, if the diameter of a substrate particle is less than approximately 100 micrometers the resultant nano-catalyst is characterized as "powder-based," whereas if the diameter of a substrate particle is greater than approximately 100 micrometers the resultant nano-catalyst is characterized as "solid-based." A powder or a solid substrate upon which nanoparticles are formed to produce nano-catalyst materials is referred to as a support material. The support material may comprise metal, such as NiAl, ceramic, a cement, or silicon or other metalloid.

In a typical process for forming a solid-based nano-catalyst a silicon wafer is washed, activated, and then modified by using a chelating agent to bind metal ions to the surface of the wafer. In alternate embodiments the silicon wafer may be replaced by a silicon structure having a different solid geometry, or may be replaced by a solid structure comprising a different material such as a different metalloid, a ceramic, or a metal. When the substrate is a metal or a metalloid the nano-catalyst is referred to as a metal-solid-based nano-catalyst, and when the substrate is a ceramic the nano-catalyst is referred to as a ceramic-solid-based nano-catalyst. The metal ions that are bound to (as in a chemical ionic bond or a chemical covalent bond or a chemical coordinate covalent bond or a chemical attraction resulting from electro-negative/positive effects) the surface of the solid substrate are then reduced by hydrogen reduction in the solid phase at high temperature to produce metal nanoparticles on the silicon wafer.

Figure 4:
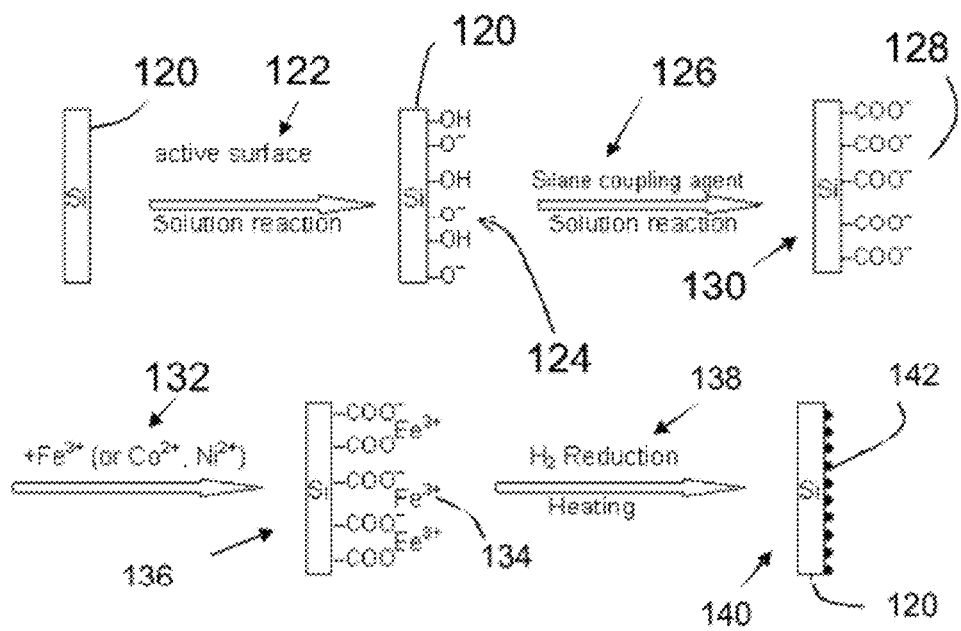
FIG. 4 is a somewhat schematic illustration of a method of fabricating nano-catalysts.

FIG. 4 presents a more detailed illustration of a process for forming a solid-based nano-catalyst. In the embodiment of FIG. 4 a silicon substrate 120 is prepared by washing the substrate in baths of one or more of the following chemicals: ethanol, acetone, chloroform, and water (each in turn), typically using ultrasonic agitation of the bath to enhance cleaning effectiveness. Then in step 122 the surface of the silicon substrate 120 may be exposed to dilute (from about 0.1 to about 2 molar) nitric acid, typically for a time ranging from about 30 minutes up to about 6 hours. Following exposure of the silicon substrate 120 to the nitric acid, as a further portion of step 122, any residual nitric acid on the silicon substrate may be removed by washing the silicon substrate, typically with water and ethanol. The step 122 develops an active surface 124 for further surface modification. An active surface is characterized as a surface that may be reacted with a coupling agent to form carboxyl groups on the surface.

In step 126 the active surface 124 of the silicon substrate 120 is exposed to a coupling agent that typically comprises a mixture of a silane compound and chloroform, which provide carboxyl functional groups. An exposure ranging from about one hour up to about 12 hours is typically sufficient to attach surface functional groups 128 and form a functionalized substrate 130. Any excess coupling agent may be removed by washing with deionized water or ethanol. As illustrated by step 132, the functionalized substrate 130 may then be exposed to a dilute metal salt solution, e.g., a solution ranging from about 0.001 to about 1 molar $FeCl_3$, to load the surface of the functionalized substrate 130 with metal ions 134 (e.g., $Fe^{3+}$ ions, or $Ni^{+2}$ ions, or $Co^{+2}$ ions, or $Co^{+3}$ ions or combinations of two or more of the four) and form a loaded substrate 136. In a step 138 the metal ions 134 that are bound to (as in a chemical ionic bond or a chemical covalent bond or a chemical coordinate covalent bond or a chemical attraction resulting from electro-negative/positive effects) the functionalized substrate material are reduced, typically by placing the metal ions 134 on the loaded substrate 136 under flowing $H_2$ at a temperature greater than about 400° C. (e.g., ranging from about 400° C. up to about 1200° C., typically about 600° C.) to form the nano-catalyst 140 as metal nanoparticles 142 on the silicon substrate 120.

It should be noted that the processes for production of powder-based nano-catalysts may be adapted for production of solid-based nano-catalysts by substituting solid substrate material for the powder substrate material. Similarly the processes for production of solid-based nano-catalysts may be adapted for production of powder-based nano-catalysts by substituting a powder substrate material for the solid substrate material.

In some embodiments where a substrate (either a powder-based or a solid-based substrate) comprising NiAl is used, an aqueous solution of an aluminum salt and a dilute acid (such as a chloride combination: $AlCl_3$+0.1M HCl, or a nitrate combination: $Al(NO_3)_3$+0.1 M $HNO_3$) may be used as an etchant to etch the surface of the substrate. In some embodiments the dilute acid may be used without a salt ($AlCl_3$ or $Al(NO_3)_3$). This etching process produces $Ni^{2+}$ ions in the etchant. Then drying the substrate in the presence of the etchant produces nano-size deposits comprising $Ni^{2+}$ ions which are reduced when heated under hydrogen to produce a nano-catalyst. In addition, this salt solution washing process works not just for NiAl substrates, but also for any nickel-containing substrate. Salt solution washes may also be used with carbon materials, such as foams. Furthermore, the salt solution washing process works for substrates comprising scandium, or titanium, or vanadium, or chromium, or manganese, or iron, or cobalt, or copper, or zinc as well as nickel. Substrates containing such metals may be etched with an acid, an aqueous aluminum salt solution, or a mixture of an acid and an aqueous solution of an aluminum salt. In some processes, such as those using iron containing substrates (such as steel), dilute hydrochloric acid or dilute sulfuric acid may perform better than other acids. It is generally beneficial to use dilute acids. For example, concentrated nitric acid may undesirably passivate some substrates comprising scandium, or titanium, or vanadium, or chromium, or manganese, or iron, or cobalt, or nickel, or copper, or zinc.

Further, note that any etchant that is typically used in microscopy to evolve the grain structure of a metal will work for that metal. In some embodiments, the etchant solution may include ethanol instead of water and/or a glycerol addition for better wetting. The following are examples of etching processes that may be used for iron- and iron-alloy-containing materials:

a. Etch an iron- or iron-alloy-containing powder or solid substrate in 100 ml of ethanol+1-10 ml nitric acid (not to exceed 10% nitric acid) for a few seconds up to a few minutes.

b. Etch an iron- or iron-alloy-containing powder or solid substrate in 50 ml cold-saturated (in distilled water) sodium thiosulfate solution and 1 gr. potassium metabisulfite; immersion at room temperature for approximately 40 seconds to 120 seconds.

c. Etch an iron- or iron-alloy-containing powder or solid substrate in 80 ml ethanol+10 ml nitric+10 ml hydrochloric acid+1 gr. Picric acid for a few seconds up to a few minutes.

d. Etch an iron- or iron-alloy-containing powder or solid substrate in 30 gr. $K_3Fe(CN)_6$+30 gr. KOH+150 ml $H_2O$ (1 sec to several minutes). Note, the potassium hydroxide should be mixed into the water before adding $K_3Fe(CN)_6$.

e. Etch an iron- or iron-alloy-containing powder or solid substrate in 20-30 ml HCl+1-3 ml selenic acid+100 ethanol at room temperature for 1-4 minutes.

f. Etch an iron- or iron-alloy-containing powder or solid substrate in 45 ml Glycerol+15 ml $HNO_3$+30 ml HCl for a few seconds up to a few minutes.

g. Etch an iron- or iron-alloy-containing powder or solid substrate in 10 gr. $K_3Fe(CN)_6$+10 gr. KOH+100 ml water for a few seconds up to a few minutes.

When a powder-based or a solid-based substrate is washed (etched) with an acid, an aqueous aluminum salt solution, or a mixture of an acid and an aqueous solution of an aluminum salt, the metal ion (salt) precipitates out as nano-size spots or dots. Then the metal ions are reduced to the "free" or uncharged state to form metal nano-catalysts when heated under a hydrogen gas flow. In some embodiments where such nano-catalysts are used to produce carbon nanotubes the hydrogen gas flow is applied both (a) during the reduction of the precipitated metal ions (nano-size spots or nano-size dots) to metal nano-catalysts and also (b) during a subsequent ethanol (or other organic) gas flow over the nano-catalysts to form carbon nanotubes. Having hydrogen present during the formation of carbon nanotubes prevents the catalysts from becoming "dead" and allows the metal nanoparticles to remain active as catalysts for extended periods of time thereby allowing the high volume of carbon nanotubes to be grown. This process makes the catalysts very efficient. The same technique of flowing hydrogen gas during the formation, growth and production of carbon nanotubes may be applied to processes using other nano-catalysts that were generated by mechanical, thermal, or chemical means to prolong the "active life" of the catalysts and thus prolong the growth/production of carbon nanotubes.

EXAMPLES

Figure 5:
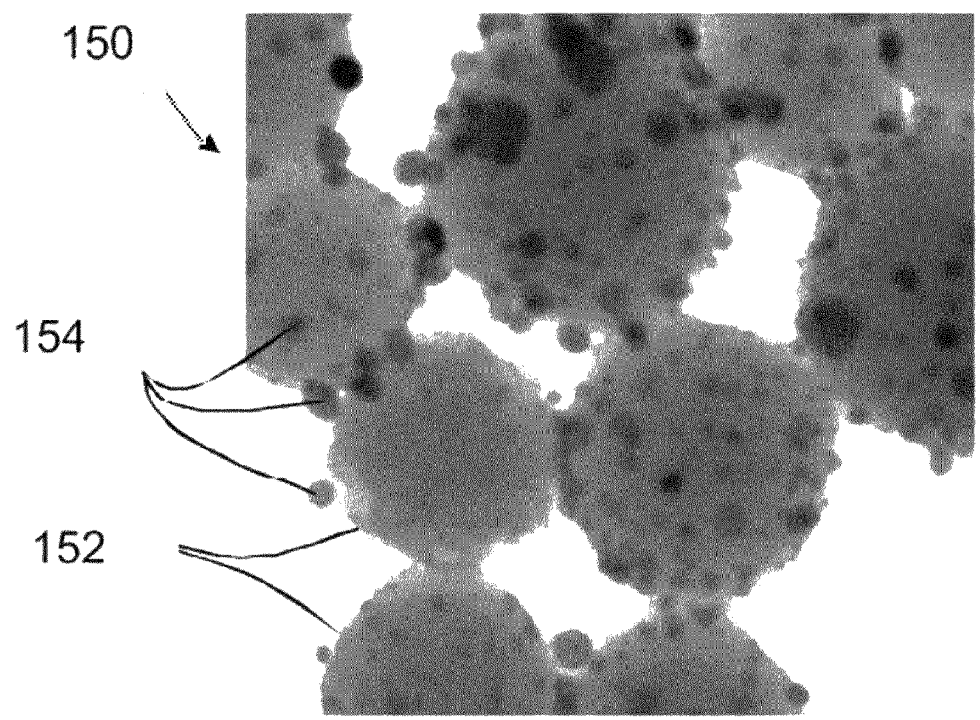
FIG. 5 is a photomicrograph of nano-catalysts.

FIG. 5 depicts an example of ceramic-powder-based nano-catalysts 150. Silicon dioxide spheres 152 have iron nanoparticles 154 disposed adjacent the surface of the silicon dioxide spheres 152. The silicon dioxide spheres 152 range in diameter from about 10 nm to about 10 microns (typically 50 nm-500 nm) and the iron nanoparticles 154 range in diameter from approximately 1 nm up to about 10-30 nm, but some iron nanoparticles 154 may be as large as 50 nm. The nano-catalysts 150 were fabricated by preparing a microemulsion media using polyethylene glycol p-tert-octylphenyl ether, hexanol, cyclohexane, and water. This water-in-oil microemulsion served as a nanoreactor to confine the resulting nanoparticle sizes. Ceramic nanospheres were grown in the microemulsion by hydrolysis of organic tetraethoxysilane (TEOS) in the presence of an ammonia ($NH_3$) catalyst. The reaction produced amorphous, spherical nanoparticles of $SiO_2$. The $SiO_2$ surfaces were then modified by hydrolysis of the organic silane with functional groups to enhance the affinity of the $SiO_2$ surfaces for metal ions. The functionalized silica particles were then exposed to a dilute solution of $FeCl_3$ wherein $Fe^{3+}$ ions were substantially homogeneously adsorbed on the surface of the $SiO_2$ particles by attachment to the —$COO^-$ functional groups. The metal ions were then reduced in the presence of hydrogen at high temperature forming the iron nanoparticles 154 adjacent the surface of the silicon dioxide spheres 152.

Figures 6A, 6B:
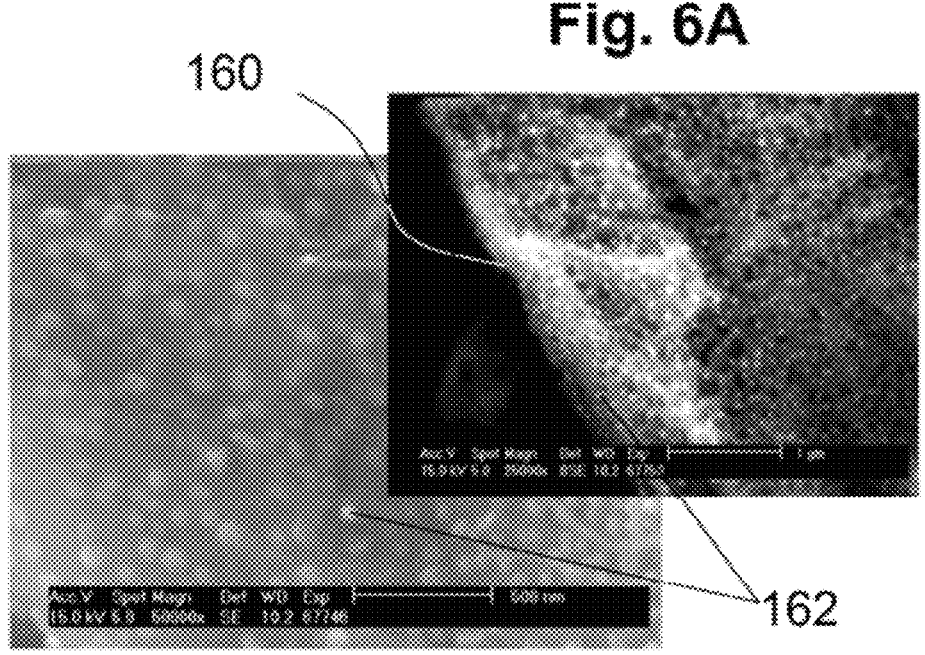
FIGS. 6A and 6B are photomicrographs of nano-catalysts.

FIGS. 6A and 6B depict scanning electron microscope images of NiAl particles 160 having Fe nano-catalyst particles 162 disposed on the surfaces thereof. FIG. 6A is a backscattered electron image.

In summary, embodiments disclosed herein provide various methods for fabricating nano-catalysts. The nano-catalysts may be powder-based or may be solid-based. The substrate powders or solids may comprise metal, ceramic, or silicon or other metalloid.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of fabricating a metal-powder-based nano-catalyst comprising:
    (a) contacting a metal powder with a solution comprising (i) metal ions from a metal salt having an anion and (ii) an acid comprising the anion of the metal salt, to form loaded metal powder comprising metal ions;
    (b) separating the loaded metal powder and substantially all of the solution comprising metal ions from each other; and
    (c) reducing the metal ions to form the metal-powder-based nano-catalyst.

2. The method of claim 1 wherein the metal salt comprises $FeCl_3$ and the acid comprises HCl.

3. The method of claim 1 wherein the solution comprising metal ions comprises a metal salt selected from the group consisting of an iron salt, a nickel salt, and a cobalt salt.

4. The method of claim 1 wherein the solution comprising metal ions comprises two or more metal salts selected from the group consisting of an iron salt, a nickel salt, and a cobalt salt.

5. The method of claim 1 further comprising before step (a), activating the surface of a metal powder and step (a) comprises contacting the metal powder with a solution comprising (i) metal ions from a metal salt having an anion and (ii) an acid comprising the anion of the metal salt to form loaded metal powder comprising metal ions.

* * * * *